United States Patent [19]

Condne et al.

[11] Patent Number: 4,831,879
[45] Date of Patent: May 23, 1989

[54] SENSOR FOR AUTOMATIC RELEASE OF OCCUPANT PROTECTIVE DEVICES IN THE EVENT OF AN ACCIDENT

[75] Inventors: Claus Condne, Wadgassen; Bernhard Mattes, Sachsenheim, both of Fed. Rep. of Germany

[73] Assignee: Robert Bosch GmbH, Stuttgart, Fed. Rep. of Germany

[21] Appl. No.: 185,527

[22] Filed: Apr. 25, 1988

Related U.S. Application Data

[63] Continuation of Ser. No. 1,662, Jan. 2, 1987, abandoned.

[30] Foreign Application Priority Data

Feb. 11, 1986 [DE] Fed. Rep. of Germany ....... 3604216

[51] Int. Cl.$^4$ .............................................. G01P 15/00
[52] U.S. Cl. ................................................... 73/516 R
[58] Field of Search ......... 73/516 R, 517 R, 517 LM; 340/52 H; 280/735, 756, 806

[56] References Cited

U.S. PATENT DOCUMENTS

| | | | |
|---|---|---|---|
| 2,665,896 | 1/1954 | Kirby et al. | 73/516 R |
| 3,097,565 | 7/1963 | Kupelian | 73/516 R |
| 3,372,386 | 3/1968 | Klinger | 73/517 R |
| 3,798,594 | 3/1974 | Funk | 340/52 H |
| 3,871,472 | 3/1975 | Hosaka et al. | 180/103 |
| 3,961,185 | 7/1976 | Brokenshire et al. | 250/231 R |
| 4,495,814 | 1/1985 | Steinke | 73/514 |
| 4,497,025 | 1/1985 | Hannoyer | 364/424 |
| 4,614,876 | 9/1986 | Mattes et al. | 307/105 B |
| 4,684,928 | 8/1987 | Takahashi et al. | 340/521 |

FOREIGN PATENT DOCUMENTS 2837181 2/1980 Fed. Rep. of Germany ... 340/52 H

Primary Examiner—Michael J. Tokar
Assistant Examiner—Robert P. Bell
Attorney, Agent, or Firm—Michael J. Striker

[57] ABSTRACT

A sensor, particularly for automatic release of occupant safety devices in power vehicles in the event of an accident, the sensor comprises a housing which forms a closed chamber; a body located in the housing and formed as a seismic mass, the closed chamber of the housing being completely filled with a fluid, the body being formed as a pendulum of a predetermined length, the chamber having a wall on which a boundary layer of the fluid is formed, the chamber having in all swinging direction of the pendulum a radius which is greater than the length of a pendulum and the boundary layer of the fluid formed on the wall of the chamber, the pendulum and the fluid having specific weights which differ from one another, the pendulum and the fluid being selected so that a friction during movement of the pendulum relative to the fluid leads to an aperiodecal damping of the pendulum.

15 Claims, 2 Drawing Sheets

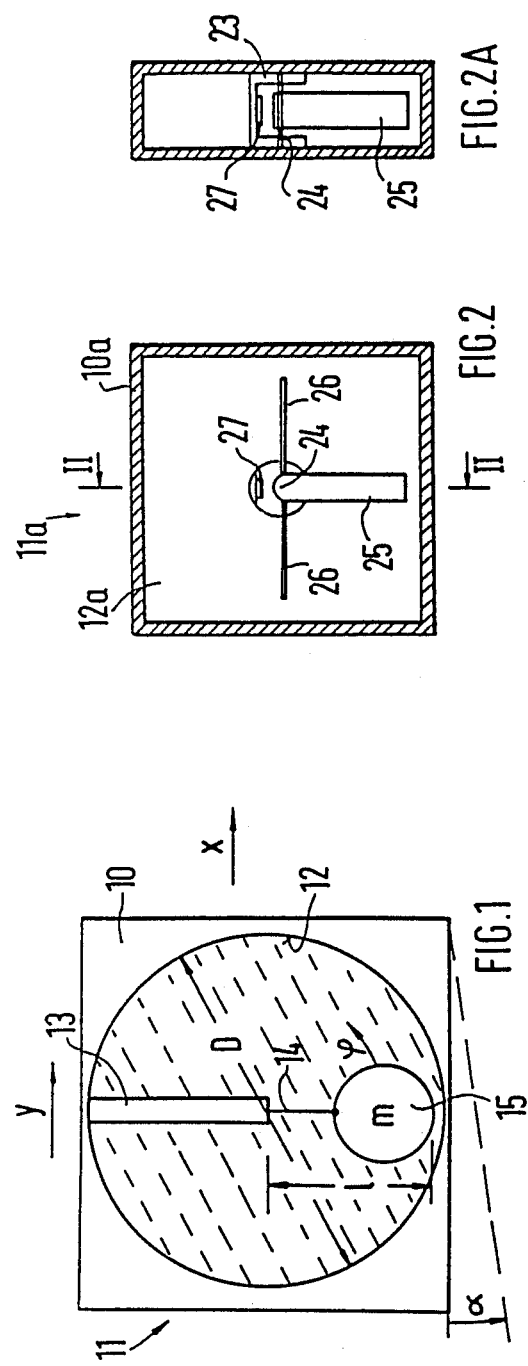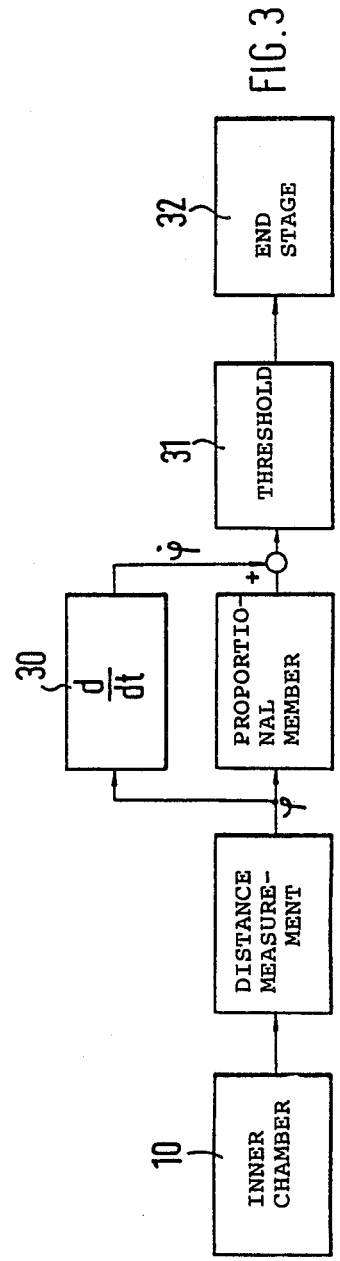

4,831,879

SENSOR FOR AUTOMATIC RELEASE OF OCCUPANT PROTECTIVE DEVICES IN THE EVENT OF AN ACCIDENT

This is a continuation of application Ser. No. 001,662, filed Jan. 2, 1987, now abandoned.

BACKGROUND OF THE INVENTION

The present invention relates a sensor for automatic release of occupant protective devices in the event of an accident.

It is known to use a sensor of the above mentioned general type in which an undampened pendulum is provided for determination of vertical deviations and translatory acceleration. During normal traveling operation of a power vehicle, only translatory accelerations take place which are smaller than the ground acceleration, for example adhesive friction of the tires. Thereby, the pendulum indicates maximum deviation from a vertical of 45°. In traveling conditions of the power vehicles which lead without rotation to greater deviations, for example in the event of crash accident or travel over a curve while the vehicle is guided by a guiding bar, the occupant safety devices must be released without breakdown occurring. The undampened pendulum, however, exhibits with respect to an outside excitement the suspension of an oscillatory system. As a result of this, the sensor even in non-critical traveling conditions, for example slalom travel, can release the occupant safety devices.

Furthermore, the pendulum can be suspended also in a closed chamber which is filled with a damping liquid. Therefore, it is possible to dampen the pendulum critically, However, its upper limiting frequency with respect to the rotation and translation is reduced, so that the sensor with a technically possibly pendulum length possesses too long reaction time. This is, however, a critical selection criteria with respect to occupant safety devices. What is really required is that the sensor reacts as fast and as delay-free as possible, and the occupant safety devices are released in the event of the accident at the proper time.

SUMMARY OF THE INVENTION

Accordingly, it is an object of the present invention to provide a sensor for releasing occupant safety device in the event of an accident, which avoids the disadvantages of the prior art.

In keeping with these objects and with others which will become apparent hereinafter, one feature of the present invention resides, briefly stated, in that the closed chamber of the housing of the sensor is completely filled with a fluid, the body which forms a seismic mass in the chamber is formed as a pendulum, the closed chamber has a radius in all swinging directions of the pendulum such that it is greater than the pendulum length and the boundary layer thickness of the fluid formed on the wall of the chamber, the specific weight of the pendulum differs from the specific weight of the fluid, and the friction during movement of the pendulum relative to the fluid leads to an aperiodical dampening.

When the sensor is designed in accordance with the present invention, it is possible to provide the dampening by the liquid only during translatory movement of the pendulum suspension and the seismic mass and not during its rotation. The danger of the resonance of the pendulum is prevented, so that a resonancefree sensor is provided which is not dampened with respect to the rotation about the pendulum suspension. Therefore, it can indicate in a delay-free manner the position of the power vehicle. Possible errors of the absolute position measurements by translatory acceleration are desired, since a respectively critical traveling situation is correctly evaluated relative to the position of the power vehicle.

With the use of the sensor as an roolover sensor, in addition to the position also the angular velocity of the vehicle can be easily derived from the position change of the pendulum with the aid of an electric evaluating circuit. It is thereby possible, with a simply built and price-favorable sensor which delivers only one resonance-free output signal, to determine in combination with an electric evaluating circuit the angular speed and the position of the power vehicle, particularly relative to both vehicle axles. It makes possible a release of the occupant safety devices at a proper time prior to a breakdown both about the longitudinal axis and the transverse axis of the power vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a view showing a longitudinal section of a sensor for releasing occupant safety devices in the event of an accident, in accordance with the present invention;

FIG. 2 is a view showing a sensor in accordance with the present invention for measurements in a single axis;

FIG. 2 A is a view showing a section taken along the line II—II in FIG. 2;

FIG. 3 is a view showing a block diagram for determination of a rotary speed.

DESCRIPTION OF PREFERRED EMBODIMENTS

Figure 4:
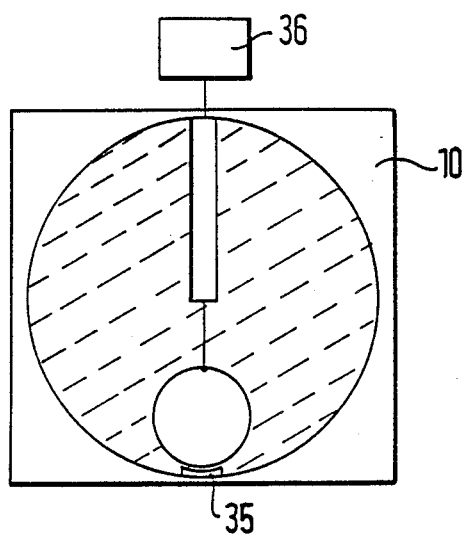
FIG. 4 is a view showing the sensor in accordance with the present invention with a restoring magnet.

A sensor for releasing occupant safety devices in the event of an accident is identified as a whole in FIG. 1 with reference numeral 11. The sensor 11 has a housing 10 with a closed inner chamber 12. The inner chamber 12 is formed rotation-symmetrical. A ball 15 which serves as a seismic mass is suspended in a center of the inner chamber 12 on a mounting element 13 by a thread 14. The thread 14 and the ball 15 together form a pendulum with the length L. The suspension point of the ball 15 and the center point of the inner chamber 12 must approximately coincide with one another.

The inner chamber 12 is completely filled with a damping liquid. The specific weight of the damping liquid must be different from the specific weight of the material of the ball 15. For damping, also it is possible to use a gas which satisfies the above requirement.

The inner chamber can also have the shape of a parallel-epiped or any other shape. What is important is that the inner chamber is designed so that during a rotation of the housing about the suspension point of the pendulum, the damping liquid remains around the pendulum practically completely quiet or stationary. This is achieved in that the radius of the inner chamber 12 of the housing 10 in any direction is greater than the length L of the pendulum and the limiting boundary layer thickness of the damping liquid formed on the wall of the sensor. With the dimensioning of the housing 10, the goal is to construct the sensor 11 as small as possible. However, the length L of the pendulum must have a lower limit selected so that it will not work as a bending beam, since the friction of the bearing must be small. The seismic mass is also determined upon this requirement.

The seismic mass can be formed both as a ball, and also can have any other shape. The mounting element 13 of the pendulum must disturb the flow of liquid as little as possible. The length of the pendulum, the shape and the weight of the seismic mass determine in connection with the desired damping, the selection of a fluid, either liquid or gas, with respective viscosity and density. As long as it is not desired to influence the damping by a special design of the seismic mass a ball can be used as such a mass.

FIG. 2 shows a sensor in accordance with the further embodiment of the invention, which is suitable for measurements in a predetermined plane. When it is desired to measure in a power vehicle a rotation both about the longitudinal axis and about the transverse axis, two such sensors must be arranged perpendicular to one another. This is disadvantageous; however by the fixed support of the pendulum, its form is freely selectable and the position measurement is especially simple. The sensor 11a has a housing 10a with an inner chamber 12a which also satisfies the above described criteria. It is to be understood that the selection criteria are reduced to a two-dimensional showing. Approximately in the center of inner chamber 12a, a holder 23 is arranged with an axle 24. A pendulum 25 formed as a seismic mass is supported on the axle 24. Additional planes or sheets 26 can be mounted on the pendulum 25 for increasing the damping in the liquid. A reflection light barrier 27 is further arranged on the holder 23. With the assistance of the reflection light barrier 27, the position of the pendulum 25 is determined by the measurement of distance to the pendulum which is formed cam-shaped in this region. This position change can also be determined by an inductive or other optical methods. A conductivity measurement is also possible.

With the use of the sensor in cabriolet-type vehicles with roll bars, as mentioned hereinabove, additionally the rotary speed is required. For extending or releasing the roll bars by the sensor during a predetermined inclination α of the power vehicle, the angular velocity of the vehicle must be known. This can be derived, as shown in FIG. 3, from the measured position change. In a manner which is known in physics, the position is then differentiated over the time.

FIG. 3 shows a block diagram. A sensor which corresponds to the above described construction measures a position change $\theta$. The angular velocity of the vehicle $\dot{\theta}$ is determined by an electronic circuit 30 from the position $\theta$ by differentiation over the time. Depending on the vehicle geometry, both signals $\theta$ and $\dot{\theta}$ are weighted and added. Upon exceeding a predetermined given threshold 31, a predetermined passenger safety device, for example the roll bar can be timely released in a so-called end stage 32, so that in the conflict situation it becomes available as a protection.

Since the sensor also exhibits translatory accelerations, it is also suitable to activate additional passenger safety devices, such as for example belt strap, warning light device or a central unlocking device. Therefore the sensor can release different safety devices one after the other, for which purpose a respective electronic frequency evaluation and different releasing thresholds are required. Also, the sensor can be used in such a manner that it simultaneously releases all safety devices of one type for all passenger occupants.

The inventive sensor delivers, with a simple and price-favorable construction, a resonance-free output signal which with the aid of electronic evaluating circuit evaluates the angular speed $\dot{\theta}$ of a power vehicle and the position to a vertical.

In accordance with the present invention, also additional means can be provided for applying a restoring force upon the pendulum. This additional means can include a spring, a magnet and the like.

The sensor in accordance with the present invention can be provided with additional means for applying a restoring force upon the pendulum. Such means can be formed for example as a magnet 35 which is shown in FIG. 4.

Figure 5:
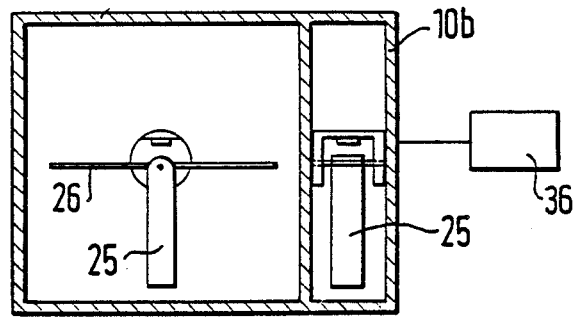
FIGS. 5 and 6 show the inventive sensor in accordance with two further embodiments for measurements in two axes.
Figure 6:
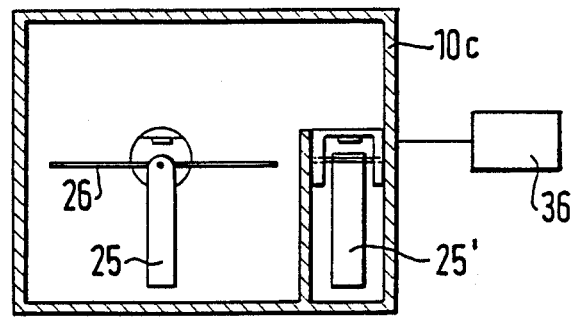

The sensor in accordance with the present invention can be provided with a second such pendulum 25' as shown in FIGS. 5 and 6. The pendulums are arranged normal to one another and each of the pendulums is formed to swing in one plane. In the embodiment shown in FIG. 5, the pendulum 25 is arranged in a housing 10b which has two separate chambers each accommodating a respective one of the pendulums 25 and 25'. The embodiment of FIG. 6 shows a sensor in which a housing 10c has a common chamber for accommodating the pendulums 25 and 25'.

Finally, reference numeral 36 identifies a schematically shown control circuit to activate the respective devices.

It will be understood that each of the elements described above, or two or more together, may also find a useful application in other types of constructions differing from the types described above.

While the invention has been illustrated and described as embodied in a sensor, particular for automatic release of occupant safety devices in power vehicles in the event of an accident, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sensor, particularly for automatic release of occupant safety devices in power vehicles in the event of an accident, the sensor comprising a housing which forms a closed chamber having a center; a body located in said housing and formed as a seismic mass, said closed chamber of said housing being completely filled with a fluid, said body being formed as a pendulum of a predetermined length and suspended centrally of said inner chamber in a suspension point corresponding to said center of said inner chamber for swinging about said suspension point, said chamber having a wall on which a boundary layer of the fluid is formed, said chamber having in all swinging directions of said pendulum a radius which is greater than the length of said pendulum and the thickness of the boundary layer of the fluid formed on the wall of said chamber, so that during rotation of the sensor about said suspension point of said pendulum the fluid in said inner chamber remains quiet and stationary and does not apply dampening action to said pendulum, said pendulum and said fluid having specific weights which differ from one another, said pendulum and said fluid being selected so that a friction during movement of said pendulum relative to said fluid leads to an aperiodical damping of said pendulum.

2. A sensor as defined in claim 1, wherein said closed chamber of said housing is formed as a rotation-symmetrical chamber.

3. A sensor as defined in claim 1, wherein said body formed as a seismic mass is a sphere.

4. A sensor as defined in claim 1; and further comprising means for inductive determination of a position change of said body.

5. A sensor as defined in claim 1; and further comprising means for optical determination of a position change of said body.

6. A sensor as defined in claim 1; and further comprising means for conductive measurement of a position change of said body.

7. A sensor as defined in claim 1; and further comprising additional means for applying a restoring force upon said pendulum.

8. A sensor as defined in claim 7, wherein said additional means for applying a restoring force upon said pendulum includes a magnet.

9. A sensor as defined in claim 1; and further comprising means for supporting said pendulum and including an axle.

10. A sensor as defined in claim 1; and further comprising a second such pendulum, said pendulums being arranged normal to one another and each of said pendulums being formed to swing in one plane.

11. A sensor as defined in claim 10, wherein said pendulums are arranged in said closed chamber of said housing.

12. A sensor as defined in claim 1, particularly for a power vehicle having a plurality of occupant protecting devices of one type for all vehicle occupants and further comprising means for releasing by said sensor all occupant protecting devices of one type for all vehicle occupants simultaneously.

13. A sensor as defined in claim 1, particularly for a vehicle having a plurality of different occupant safety devices of one type for all vehicle occupants and further comprising means forming a plurality of releasing stages formed so that the sensor releases the different occupant safety devices at different time points.

14. A sensor as defined in claim 1; and further comprising electronic evaluation means for differentiating an output signal of the sensor over time for determining an angular velocity of the vehicle.

15. A sensor as defined in claim 14, wherein said means for electronic evaluation includes means for weighting and adding a value for the angular velocity and for the position.

* * * * *